Nov. 8, 1927.
P. G. ROBINSON
1,648,059
LOCOMOTIVE
Filed Nov. 18, 1926      4 Sheets-Sheet 2
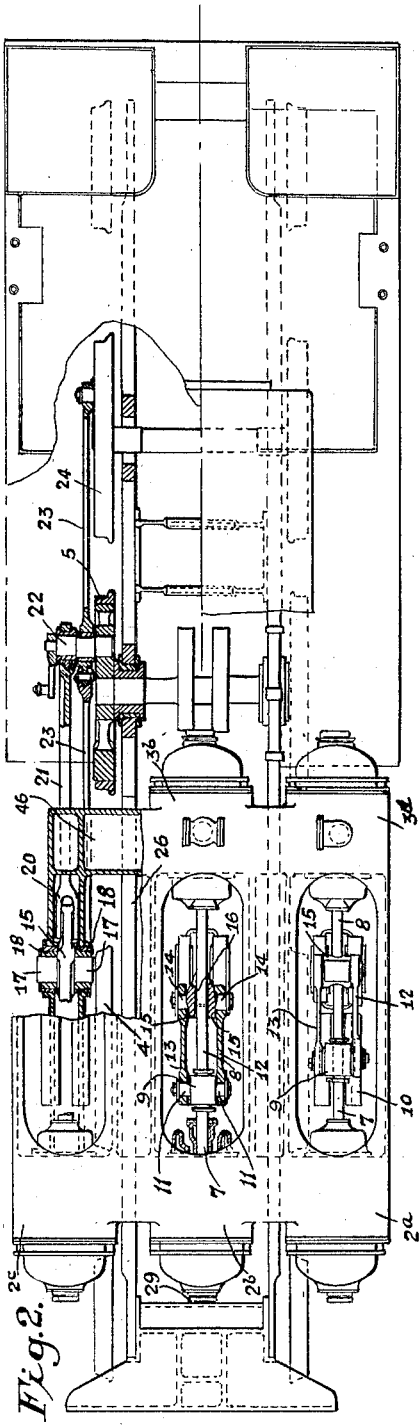
INVENTOR Nov. 8, 1927.

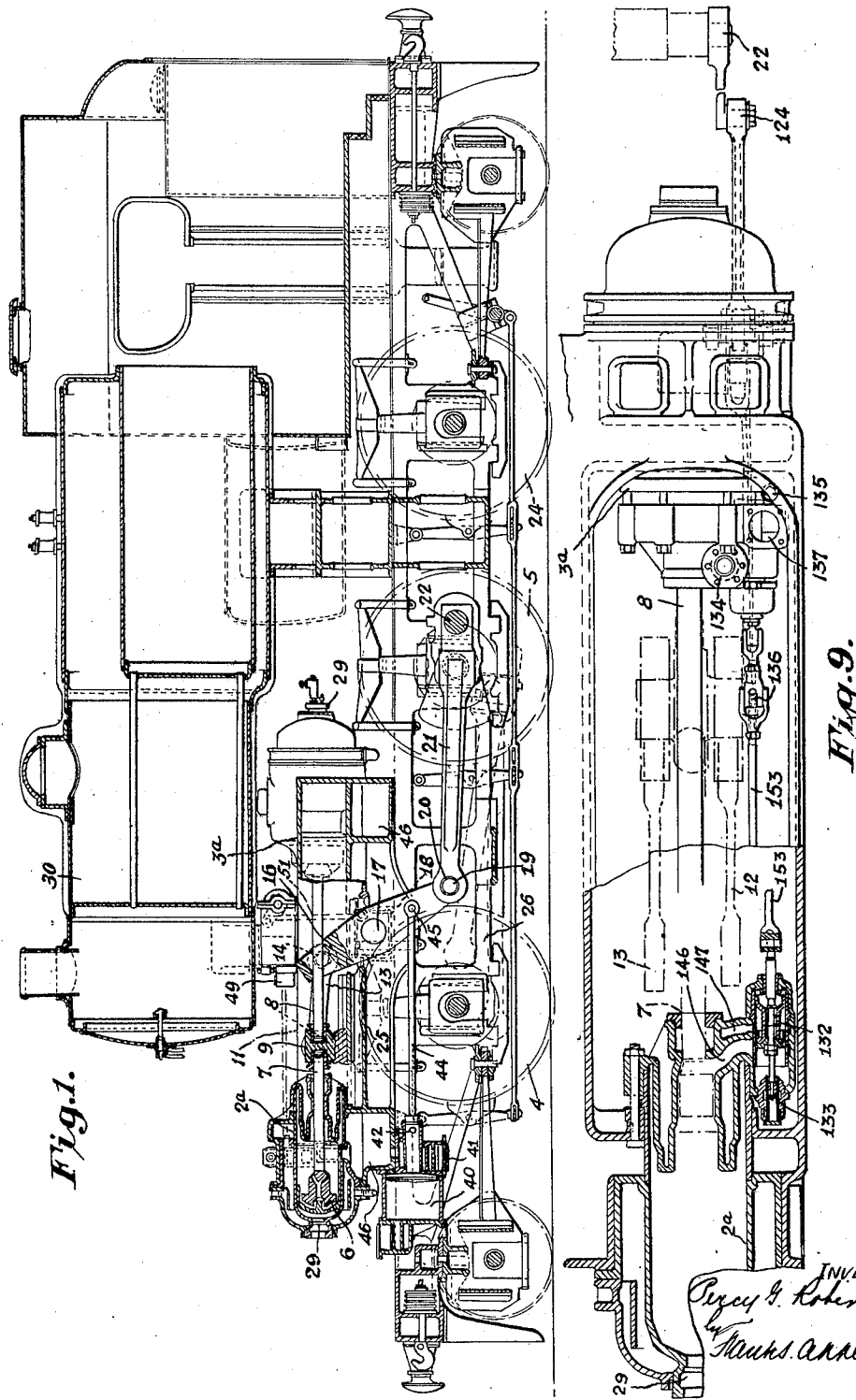

P. G. ROBINSON 1,648,059

LOCOMOTIVE

Filed Nov. 18, 1926    4 Sheets-Sheet 3

Nov. 8, 1927.
P. G. ROBINSON
1,648,059
LOCOMOTIVE
Filed Nov. 18, 1926   4 Sheets-Sheet 4
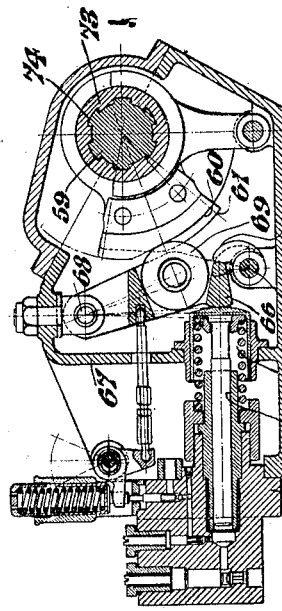

Patented Nov. 8, 1927.

1,648,059

UNITED STATES PATENT OFFICE.

PERCY GRIERSON ROBINSON, OF STREATHAM HILL, LONDON, ENGLAND.

LOCOMOTIVE.

Application filed November 18, 1926. Serial No. 149,221, and in Great Britain October 16, 1925.

This invention relates to locomotives and has reference to locomotives adapted to be driven by internal combustion engines and particularly that type of engine, where steam is used expansively at the backs of the combustion engine pistons, although an independent set of steam or air cylinders may be used in combination with the internal combustion engine which engine may be of the conventional type operated wholly by the internal combustion of carbonaceous fuels.

The present invention comprises a locomotive having in the power transmission mechanism oppositely disposed pairs of power cylinders having usual or coaxially coupled piston rods connected to a common crosshead which is connected by a linkage to the upper end of a rocking beam of which the lower end is connected to the small end of a substantially horizontal connecting rod of which the large end is on a crank of the main driving wheels or axle. The cylinders are preferably so arranged that their weight will be located within the fixed wheel base.

Each of the outer and oppositely disposed engines is of the internal combustion type, and may be constructed to operate on the two stroke cycle principle, and in the preferred form are of the "Still" engine type.

The use of internal combustion engines of considerable power involves the use of heavy reciprocating masses a feature particularly objectionable in locomotives. In internal combustion engines provided with scavenging blowers arranged parallel to the cylinders the present invention enables such objection to be remedied by dividing the weight of such masses into two portions which are connected to a rocking beam in such a manner as to move in opposite directions to one another simultaneously, one portion of these reciprocating masses consisting of the main pistons, piston rods, crossheads and connecting links of the engines, and the other the main connecting rod and the piston and connecting link of the blower.

Another advantage of the use of oppositely disposed cylinders, is that by connecting the oppositely disposed piston rods to a common crosshead all the bearings of the transmission mechanism will be loaded alternatively in opposite directions.

Figure 8:
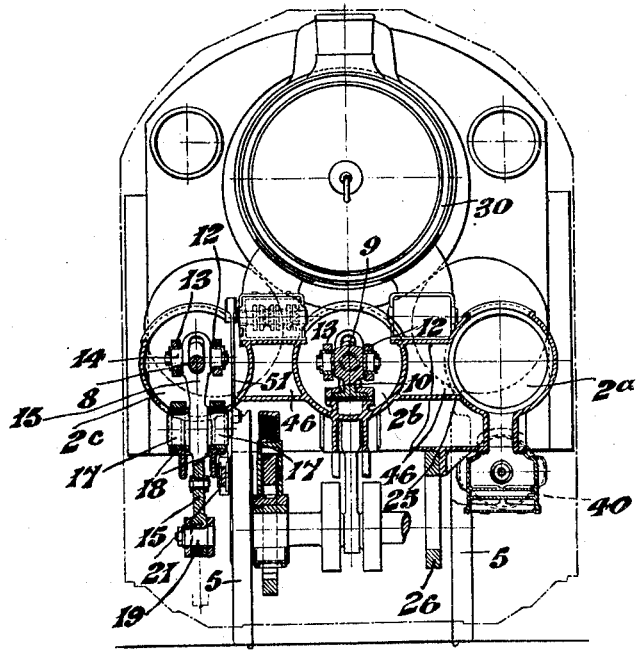
Figure 10:
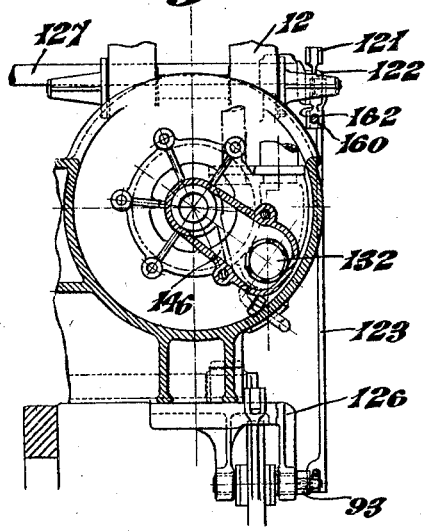

An embodiment of the invention is illustrated by the accompanying drawings wherein Figure 1 is a central sectional elevation of a general view of the locomotive, Figure 2 is a partly horizontal sectional plan of Figure 1, Figure 3 a partly sectional end view of Figure 1, Figure 4 is an end view of the fuel injection mechanism, Figure 5 is a sectional view through a fuel injection pump, Figure 6 a horizontal section of Figure 5, Figure 7 a sectional view through the fuel pump casting at the cam shaft, Figure 8 is a side view partly in section illustrating the valve mechanism, Figure 9 a partial section and plan view of Figure 8, and Figure 10 an end view of portion of Figure 8.

In these drawings the locomotive has three sets or pairs of cylinders $2^a$, $3^a$, $2^b$, $3^b$ and $2^c$, $3^c$ arranged horizontally and side by side above the driving wheels 4 and 5 so that their weight is supported wholly or principally by such driving wheels, it being of primary importance to concentrate as much of the weight as possible within the fixed wheel base. The piston 6 of the cylinder $2^a$ and also that of the cylinder $3^a$ have their rods 7 and 8 attached to a single crosshead 9 sliding in a guide 10, the crosshead 9 being provided with trunnion pins 11 whereby it is connected by links 12 and 13 to similar trunnions 14 at the upper end of a rocking beam 15. The upper end of the rocking beam 15 is perforated at 16 in such a manner that the piston rod 8 will slide freely through it at all inclinations of the rocking beam.

The rocking beam 15 is provided with fulcrum trunnions 17 mounted in bearings 18 on a casting 25 on which the cylinders are mounted and which is fixed on the main frame 26 of the locomotive. The lower end of each rocking beam 15 is coupled by trunnions 19 to the small end 20 of a main connecting rod 21 of which the large end is mounted on the crank pin 22 of the driving wheels 5. the crank pin 22 being coupled by the coupling rods 23 to the crank pin on the driving wheels 4 and 24. The length of the arms of the oscillating lever or rocking beam 15 above and below the fulcrum trunnions 17 are proportioned according to the stroke of the piston and the path of the crank pin 22.

A steam generator or boiler 30 is provided conforming in general appearance to the boiler of an ordinary steam locomotive and this boiler is separately fired for starting up and overload purposes and also if desired for the generation of steam for normal running. Such boiler may however be either partly or wholly heated by the exhaust gases from the internal combustion engine. For this purpose the exhaust products from the internal combustion engine cylinders are conveyed through separate banks of tubes in the boiler. The exhaust from the steam side of the engine may be utilized in the conventional manner for the production of a draught through the tubes.

The cylinders operate on the two-stroke cycle and below them are arranged scavenging blower cylinders 40 and scavenging air passages 46 leading therefrom to the combustion cylinders. Each blower cylinder 40 has a piston 41 of which the trunk 42 is connected by a joint with a connecting link 44 of which the other end is connected by a pin 45 with lower arm of the rocking beam 15. Any suitable fuel injection device may be provided at 29.

Where three rocking beams 15 are used and difficulty is experienced in accommodating a blower between the frames, such blower may be dispensed with as the central rocking beam does not require to be so completely balanced as the two outside beams because of its central position relative to the engine frame.

A form of fuel injector pump mechanism suitable for the locomotive illustrated by Figures 1 to 3 is illustrated by Figures 4 to 7.

The fuel injection pumps 49 are divided into two groups each consisting of three pumps arranged in plan at $50^a$, $50^b$ and $50^c$ each group being driven by a rod 51 connected at its lower end by a pin 53 to a guide link 54 sliding on a crank-slide 55 attached to a rocking beam 15 and arranged to be adjustable by suitable means, as a screw and nut 56 for varying the crank travel. The upper end of the rod 51 is connected by a pin 57 to one end of a lever 58, the other end of the lever 58 being fixed to a shaft 59 on which are fixed three pairs of pump cams 60, 61.

The reversing of the pumps is effected by employing two cams 60 and 61 for each pump one for forward running and the other for backward running. Each pump plunger 63 is forced outwards by a spring 65 and inwards by a lever 66 pivoted at 68 to the pump frame 67 and carrying a roller 69 adapted to be engaged by either the cam 60 or the cam 61 during the rocking of the shaft 59 by the lever 58 from the rocking beam 15. The forward or backward cam is brought into line with the pump plunger 63 by means of a single control lever 64 mounted loose upon an extension of the cam shaft 59. The lower end of the control lever 64 is formed as a quadrant provided with a peripheral groove 70 as shown by the adjacent projection of this end of the lever in Figure 4. The groove 70 engages a roller 71 fixed on a cam traversing shaft 72, the cams 60 and 61 being fixed to a sleeve 73 sliding on splines 74 on the shaft 59. The lever 64 is also connected by a link 75 and arm 85 to a cam roller lifting shaft 76.

In the operation of this mechanism during a partial movement of the control lever 64 from position I to position II the main cam engaging rollers 69 are lifted clear of the cams 60 and 61 by the cams 84 on the shaft 76, and further movement of the lever 64 to position III slides the sleeve 73 carrying the cams 60 and 61 along the shaft 59, and the completion of the movement of the lever 64 to position IV allows the rollers 69 to re-engage the cams 60 and 61 brought into line therewith by the inclined portion of the groove 70.

As shown in Figures 8 to 10 each of the combustion exhaust control or supercharging valves 92 is operated by means of an arm 120, link 121, bell-crank lever 122 and link 123 from a lever or arm 93 secured on the shaft 100 of the steam gear radius link 94 which provides a movement of 90° for these valves to the main cranks 22, the radius link 94 being operated from a crank pin 124 by a connecting rod 125. The radius link is carried by a bracket 126 secured to the supporting casting 25 of the engine cylinders.

The reversing of the valves 92 is effected by means of the bell-crank lever 122 which rocks on the pin 128 of a crank 129 of the shaft 127 which is a reversing shaft operated by a lever 130 and link 131 connected to the operating mechanism. The lever 130 is also connected by a link 32 to the lever 64 of the fuel pump mechanism. By reason of the crank 129 the valves 92 have two closed positions, one at $a$ for backward running and the other at $b$ for forward running. The corresponding valve to 92 on the opposite cylinder of the pair is operated by a rod 160 connected at one end by a pin 161 to an extension 162 of the bell-crank lever 122 and at the other by a pin 163 on the operating arm of the opposite valve.

In the example illustrated the internal combustion engines are of the kind using steam on the opposite side of the piston to that on which combustion takes place, the steam valves 132 control steam from the boiler admitted through the pipe 134, and exhausted through a pipe 137. The steam pipe 134 leads to passage 147 (see Figure 9), 146 being the steam and exhaust port of the steam side of the cylinder.

The steam valves 132 are controlled and operated by a modified form of Walschaert gear (see Figure 8) of which the radius link 138 is connected by a link 140 and levers 150 and 151 to an operating control rod 152. In this gear the admission of steam to the cylinder before the crank reaches its dead centre is provided for by a suitable proportioned lever 136 connected by a pin 47 to the link 138 of the Walschaert gear. The lever 136 rocks about a fulcrum pin 139 fixed eccentrically on the fulcrum shaft 17 of the main rocking beam 15. The rocking lever 136 is connected at its upper end by a pin 112 to a valve rod 153 of the steam valves 132 arranged at its opposite ends.

Steam is also admitted to the combustion side of the piston for starting purposes from a steam supply pipe 135 to a steam valve 133 arranged co-axially with and driven by the main steam valve 132. The valve 133 admits steam to the internal combustion end of the cylinder through a pipe 148.

In the example shown, the mechanism for producing the effect of supercharging comprises a valve controlling the last period of the exhaust. In some instances, however, supercharging is effected by controlling the timing period of admission of the scavenging air. Where the latter method is adopted the interlocking with the fuel pump reverse gear may equally well be effected, thus the terms exhaust or supercharge control used herein are to be regarded as alternative.

What I claim and desire to secure by Letters Patent is:—

1. A locomotive having in its power transmission mechanism oppositely disposed pairs of power cylinders having coaxially coupled piston rods connected to a cross-head, a rocking beam, a linkage connected to the upper end of the rocking beam and to the cross head the lower end of the rocking beam being connected to one end of a connecting rod which is attached to a crank for the main driving wheels.

2. A locomotive in accordance with claim 1, wherein the weight of the intermediate cylinders is concentrated within the fixed wheel base.

3. A locomotive in accordance with claim 1, wherein the oppositely disposed cylinders of each pair are the cylinders of internal combustion engines.

4. A locomotive in accordance with claim 1, wherein the oppositely disposed cylinders of each pair are the cylinders of two-stroke cycle internal combustion engines giving power strokes alternatively.

5. A locomotive in which the power mechanism comprises longitudinally and oppositely located outer pairs of power cylinders, piston rods therefor connected to driving wheels of the locomotive, a driven crank shaft associated with the driving wheels, an intermediate pair of power cylinders positioned parallel with and between said outer pairs of power cylinders, and a rocking beam connected with the piston rods of said intermediate cylinders and with the said driven crank shaft.

6. A locomotive in accordance with claim 1, wherein the piston rods of alined cylinders pass through openings in the rocking beams fulcrumed below the cylinders.

7. A locomotive having oppositely disposed pairs of outer power cylinders, piston rods for said cylinders, means for connecting the piston rods of the outer cylinders with the driving wheels of the locomotive, an intermediate pair of power cylinders, a rocking beam, means for connecting the rocking beam with the piston rods of the cylinders, a shaft for the driving wheels of the locomotive, an intermediate crank on the shaft, and means for connecting the crank portion of the shaft with the lower end of the rocking beam.

8. A locomotive having longitudinally and oppositely located outer power cylinders, a pair of power cylinders located between said outer cylinders, pistons and piston rods for the cylinders, crank shafts for a pair of driving wheels of the locomotive, means for connecting said driving wheels with the piston rods of the outer cylinders, a rocking beam connected with the piston rods of the inner power cylinders, means for connecting such rocking beam to one of the driving axles, fuel pumps operated by forward and reverse cams operating on a roller carrying lever engaging directly the plungers of the pumps, characterized in that the forward and reverse cams are moved axially along their shaft by the mechanism connecting the exhaust control valve operating lever with the reversing mechanism.

9. In a power transmission mechanism for locomotives, oppositely disposed steam and internal combustion power cylinders, pistons and piston rods therefor, cross heads to which the piston rods of the cylinders are attached, rocking beams, linkage for connecting the cross heads with the rocking beams, and linkage connecting the lower ends of the rocking beams with driven axles of the locomotive.

10. A locomotive in accordance with claim 5 wherein the steam valves have attached to their spindle an auxiliary steam valve admitting steam to the combustion side of the pistons for starting purposes.

In witness whereof I affix my signature.

PERCY GRIERSON ROBINSON.